United States Patent [19]

Kasugayama et al.

[11] 4,306,245

[45] Dec. 15, 1981

[54] LIQUID JET DEVICE WITH CLEANING PROTECTIVE MEANS

[75] Inventors: Yukio Kasugayama; Masatsune Kobayashi, both of Yokohama; Shigeyuki Matsumoto; Yoshihumi Hattori, both of Kawasaki, all of Japan

[73] Assignee: Canon Kabushiki Kaisha, Tokyo, Japan

[21] Appl. No.: 75,970

[22] Filed: Sep. 17, 1979

[30] Foreign Application Priority Data

| | | | |
|---|---|---|---|
| Sep. 21, 1978 | [JP] | Japan | 53-117238 |
| Sep. 21, 1978 | [JP] | Japan | 53-117239 |
| Sep. 21, 1978 | [JP] | Japan | 53-117241 |
| Jan. 30, 1979 | [JP] | Japan | 54-9333 |
| Jan. 30, 1979 | [JP] | Japan | 54-9334 |
| Jan. 30, 1979 | [JP] | Japan | 54-9335 |
| Jan. 31, 1979 | [JP] | Japan | 54-10189 |

[51] Int. Cl.³ .......... G01D 15/18

[52] U.S. Cl. .......... 346/140 R

[58] Field of Search .......... 346/140 R, 140 PD, 140 A

[56] References Cited

U.S. PATENT DOCUMENTS

| | | | |
|---|---|---|---|
| 3,739,384 | 6/1973 | Harrins | 346/140 X |
| 3,832,579 | 8/1974 | Arndt | 346/140 X |
| 3,953,862 | 4/1976 | Amberntsson | 346/140 |
| 4,025,928 | 5/1977 | Hou | 346/140 A |
| 4,119,034 | 10/1978 | Wax | 346/140 X |
| 4,144,537 | 3/1979 | Kimura | 346/140 |

*Primary Examiner*—Joseph W. Hartary

*Attorney, Agent, or Firm*—Fitzpatrick, Cella, Harper & Scinto

[57] ABSTRACT

A liquid jet recording device is provided with a cleaning protective means for cleaning and protecting the orifice. This means is provided at a reset position lying at one end of the scanning shaft of the device.

9 Claims, 25 Drawing Figures

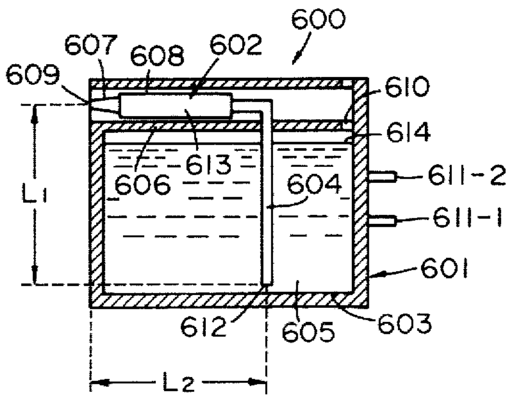
FIG. 6a
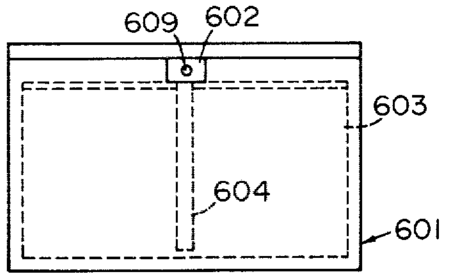
FIG. 6b
FIG. 6
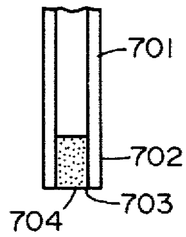
FIG. 7
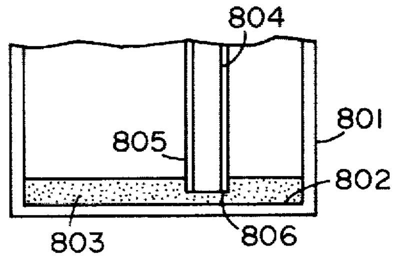
FIG. 8

LIQUID JET DEVICE WITH CLEANING PROTECTIVE MEANS

BACKGROUND OF THE INVENTION

1. Field of the Invention

This invention relates to a liquid jet device for exhausting and flying liquid drops through an orifice in accordance with an electrical signal and to a liquid jet recording apparatus provided with the same.

2. Description of the Prior Art

In a liquid jet recording apparatus, the open system supply mechanism as shown in FIG. 1 of the accompanying drawings is possible in principle as a feature thereof. That is, in a system filled with recording liquid (so-called ink) from a tank (liquid reservoir) 103 having a vent hole 104 so as to always maintain the pressure within the tank at the atmospheric pressure to a recording head 101 through a supply passageway 102, the amount of decrease of the recording liquid exhausted as liquid drops 105 from the end of the head 101 (exhaust orifice) in accordance with an electrical signal applied to the recording head 101 may be successively replenished to the end of the head 101 by the surface tension of the liquid. However, where such a system is applied to various recording apparatuses, there occur various problems. First, when the apparatus body is inclined, a height difference (level difference) occurs between the tank 103 and the exhaust orifice due to some degree of distance present from the tank 103 to the end of the head 101 and the meniscus of the recording liquid formed by the exhaust orifice may be retracted toward the supply passageway or conversely, the liquid may leak from the exhaust orifice. Accordingly, in case of the retraction of the meniscus, the meniscus can be recovered as by pressing the liquid from the tank 103 side, but in the case of the leakage, the interior of the apparatus is stained with the liquid. Such inclination often occurs during transportation or movement of the apparatus and frequently occurs in the case of, for example, a desk-top type calculator or a small typewriter. Therefore, if the recovery of the retracted meniscus must be effected or the interior liquid leaks each time the apparatus is moved, such apparatus cannot be a practical product.

Also, when agitation or impact is imparted to the apparatus, the leakage of the liquid and the retraction of the meniscus resulting from said inclination of the apparatus are accelerated. That is, when an extraneous stress such as agitation or impact is applied to the apparatus body or the supply passageway 102, the meniscus in the exhaust orifice is readily destroyed by such extraneous stress and the liquid is exhausted outwardly as liquid drops or the meniscus is retracted. At this time, when the apparatus is in its inclined condition, namely, when there is a level difference, the once destroyed meniscus cannot readily restore its original condition but may continuously leak outwardly or may be retracted in the supply passageway to a position in which a balanced condition may be maintained. Such agitation or impact usually frequently occurs, and always occurs particularly in the case of an apparatus in which the recording head 101 is reciprocally moved relative to a recording medium to effect recording.

A further important problem to be solved is that when recording is effected with the recording head being reciprocally moved at high speed relative to a recording medium such as paper or the like as in a small printer, the supply passageway is vibrated following the movement of the head 101 with a certain point on the tank 103 side as a fulcrum. At this time, the liquid contained in the supply passageway 102 is subjected to the influence of centrifugal forces, and the centrifugal forces so applied increase as the mass of the liquid contained in the supply passageway 102 is greater or the speed of the reciprocal movement is greater. When these centrifugal forces overcome the retention force of the meniscus, the liquid is caused to flow out through the exhaust orifice even if a print signal is not applied to the recording head. This means that the apparatus and the recording medium are stained with the liquid, and it is a fatal drawback in practice.

To avoid such inconvenient phenomenon resulting from the reciprocal movement of the recording head portion during recording, liquid jet devices designed so that the recording head portion and the tank portion (liquid reservoir portion) are moved together are disclosed, for example, in U.S. Pat. No. 3,953,862, U.S. Pat. No. 3,967,286 and U.S. Pat. No. 4,095,237.

To overcome the above-noted inconvenience, the liquid jet devices disclosed in these patents are not only designed so that the recording head portion and the liquid reservoir portion are moved together, but also improved so that when the device is reciprocally moved during recording, the liquid may not leak from a vent hole provided in the liquid reservoir portion as the result of the vibration of the liquid in the liquid reservoir portion caused by the acceleration and deceleration or air may not be mixed with the liquid.

However, in the liquid jet devices having constructions as disclosed in these prior arts, the positional relation between a liquid chamber for producing the motive power of the requid jet of the recording head portion and the liquid level in the liquid reservoir portion is random, so that the exhaust of the liquid becomes unstable with the lowering of the level of the liquid in the liquid reservoir portion and the supply of the liquid to the liquid chamber cannot be accomplished smoothly and speedily, and the probability with which the supply passageway is clogged is high because a portion of such liquid passageway from the liquid reservoir portion to the liquid chamber lies below the bottom surface of the liquid reservoir portion, and when the supply passageway is clogged, it is difficult to repair the clogged portion. Thus, the devices according to the prior art should be improved in these points.

It will thus be understood that from these practical problems, it is very difficult for the open system supply mechanism which is possible in principle to be applied to an actual recording apparatus.

In contrast, there is a liquid jet recording apparatus having a so-called hermetically sealed system supply mechanism. As shown in FIG. 2 of the accompanying drawings, this system has a pressurizing mechanism 205 in a tank 203 and adopts a method whereby the amount of decrease of the liquid exhausted from a head 201 is replenished by opening-closing of a valve 206 provided in a supply passageway 202, or the tank 203 is designed similarly to the tank 103 of FIG. 1, namely, such that the internal pressure of the tank is identical to the atmospheric pressure and the tank 203 is provided with no special pressurizing mechanism but a pressurizing mechanism is provided in the valve 206. The opening-closing of the valve 206 may be accomplished in accordance with a signal from a liquid amount detector such as a pressure sensor provided adjacent to the head 201 or in the supply passageway 202. The portion from the valve 206 to the head 201 can be considered to be a hermetically sealed system and therefore, the aforementioned problems occurring to the open system may be considerably reduced. However, this hermetically sealed system supply mechanism, as will be appreciated from the simple illustration of FIG. 2, requires a complicated mechanism and involves a considerable cost and cannot make the best use of its characteristics.

The inventors have analyzed the problems peculiar to the open system supply mechanism and as a result, could develop a liquid jet recording apparatus which is very simple in construction and which has a practically sufficient printing stability and reliability.

SUMMARY OF THE INVENTION

It is a primary object of the present invention to provide a liquid jet device which eliminates the disadvantages peculiar to the liquid jet device according to the prior art.

It is another object of the present invention to provide a liquid jet recording apparatus which is simple and compact and which has a high printing stability and reliability with respect to extraneous forces such as vibration, impact and inclination.

It is still another object of the present invention to provide a liquid jet recording apparatus in which stable liquid supply can always be accomplished even during highspeed recording so that recording can be accomplished faithfully and reliably in response to recording signals.

It is yet still another object of the present invention to provide a liquid jet device which comprises a recording head portion provided with an orifice provided at the end of the recording head portion for exhausting liquid therethrough, a liquid chamber portion communicated with the orifice, a supply passageway for supplying the liquid to the liquid chamber portion, and liquid drop exhaust energy generating means mechanically coupled to at least a part of the liquid chamber portion in such a coupled relationship that liquid drop exhaust energy can be supplied to the liquid present in the liquid chamber portion; a liquid reservoir portion connected to the head portion so that the liquid present in the interior is supplied to the liquid chamber portion from an inlet at one terminal end of the supply passageway; and extraneous electrical connector means for supplying an extraneous electrical signal to the liquid drop exhaust energy generating means to drive said generating means; said portions and means being movable together, said liquid chamber portion lying at a height from the liquid surface in the liquid reservoir portion whereat the liquid present in the liquid reservoir portion can be suppled to the liquid chamber portion by a capillary force.

It is also an object of the present invention to provide a liquid jet recording apparatus provided with the above-described liquid jet device.

BRIEF DESCRIPTION OF THE DRAWINGS

FIGS. 6(*a*) and (*b*) are a cross-sectional view and a front view, respectively, showing a preferred embodiment of the liquid jet device according to the present invention.

FIGS. 7 and 8 are fragmentary views showing another embodiment of the present invention.

DESCRIPTION OF THE PREFERRED EMBODIMENTS

Figure 1:
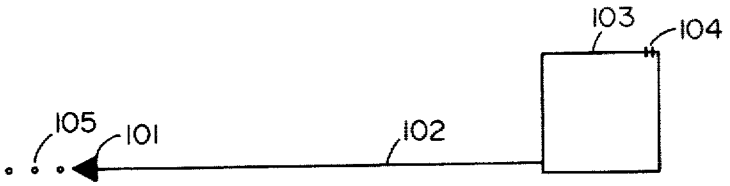
FIG. 1 PRIOR ART
FIGS. 1 and 2 illustrate the principles of the open system and the hermetically sealed system supply mechanism of a liquid jet recording apparatus.
Figure 2:
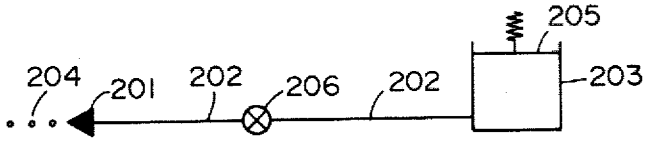
FIG. 2 PRIOR ART

The present invention has been achieved by carrying out the experiment as described hereinafter as an example while studying it in detail from various points of view.

In a recording apparatus having a liquid jet device, the resistance force against the level pressure resulting from inclination and the acceleration to which the liquid in the supply passageway is subjected may be considered to be the meniscus holding force in the exhaust orifice and the capillary progressing force in the head portion or the supply passageway.

It has already been mentioned that the necessity of the meniscus holding force is important in the liquid jet recording apparatus, but the capillary progressing force in the liquid supply passageway until the liquid comes to the exhaust orifice is also important. This is because, even if retraction of the meniscus occurs due to inclination of the apparatus, if the capillary progressing force is great, the liquid can be moved to the exhaust orifice by the force of the capillary when the liquid level restores its normal level, and the recovery by another means becomes unnecessary.

This meniscus holding force and the capillary progressing force are determined by the diameter of the orifice provided at the end of the recording head, the degree of reduction of area of the fluid flow path to the orifice, and the correlation between the critical surface tension of the material forming the orifice and the surface tension and viscosity of the liquid used.

The meniscus holding force and the capillary progressing force may be considered in the same manner as the capillary rising force in the field of capillary chemistry.

The height to which liquid rises in the capillary due to capillary phenomenon is generally expressed as follows:

$$H = \gamma 2 \cos \theta / r \rho g$$

where

H: the height to which liquid rises
$\gamma$: surface tension of the liquid
$\rho$: density of the liquid
r: radius of the capillary
$\theta$: angle of contact
g: gravity acceleration This equation may actually apply only to an ideal system, but qualitatively it is seen that if $\gamma$ and $\rho$ of the liquid are constant, the smaller is $\theta$ (that is, the critical surface tension $\gamma_c$ of the wall material is greater than $\gamma$) and the smaller is $\gamma$, the greater is H. It may be said that the meniscus holding force is great if the material forming the orifice portion is glass or metal which has a high critical surface tension and the diameter of the orifice is small. Also, if the diameters of the flow path in the head to the orifice and the supply passageway are small and the distance to the tank portion containing liquid therein is short, the meniscus will naturally restore its original position immediately even if retraction of the meniscus occurs for some reason or other. Conversely, even if a liquid level pressure variation which will cause leakage occurs, for example, an impact force is applied with the orifice portion underlying, the liquid jumps out from the orifice only when such impact force is applied, but the liquid never flows out continuously.

The present invention has been achieved on the above-described background and is based on the fact that as the result of various experiments and studies, the solution to the aforementioned problems has been found out basically by restricting the difference in height between the recording head portion and the surface of the recording liquid in the liquid reservoir portion and the length of the liquid supply passageway as will hereinafter be described in detail. Also, to achieve the objects of the present invention more effectively, the recording head portion and the liquid reservoir portion are constructed as an integral structure which may be mounted on a movable carriage.

The invention will hereinafter be described in detail with an example of the experiment mentioned, but the invention is not restricted to the scope hereinafter described.

To achieve the present invention, the inventors have carried out various basic studies as to the capillary rising force, the meniscus holding force during inclination of the apparatus, and the meniscus holding force for acceleration. The recording head used for such studies is of the construction as schematically shown in the cross-sectional view of FIG. 3, and comprises a glass tube nozzle 302 (including an orifice 303 and a liquid chamber portion 306) and cylindrical piezoelectric element 304 as an electromechanical converter. Designated by 303 is an exhaust orifice having a diameter of 0.060 mm. The inner diameter of the glass tube nozzle 302 is 0.6 mm and the full length thereof is 18 mm. The recording liquid used has a surface tension of 45 dyne/cm and viscosity of 3 cps.

Figure 3:
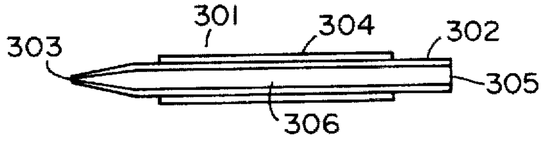
FIG. 3 is a basic schematic view of a recording head used in the present invention.
Figure 4:
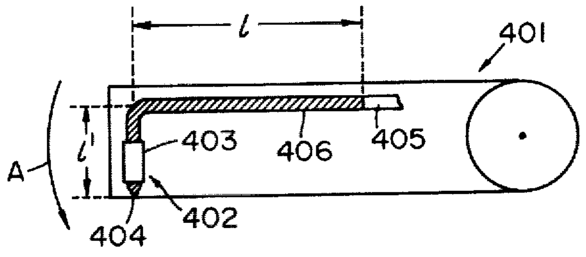
FIG. 4 is a schematic view for illustrating the measuring system according to the present invention.

When the capillary rising force has been measured with respect to various tubes, a glass tube of 0.6 mm has presented 45 mm, a polyethylene tube has presented 16 mm, and a Teflon tube has presented 0 mm. Also, in the case of a combination of pure water and a glass tube, the capillary rising force has been 58 mm. When the meniscus holding force is measured with a polyethylene tube of the same diameter as the glass tube nozzle 302 of the recording head similar to that shown in FIG. 3 being connected to the end 305 of such glass tube nozzle, retraction of the meniscus and leakage do not occur up to the difference of 100 mm in level from the liquid surface in the liquid reservoir portion. However, when a light vibration is imparted to this device, liquid leakage and retraction of the meniscus occur at the level difference of 60 mm. Further, to measure the meniscus holding force for acceleration, the recording head with the aforementioned polyethylene tube has been disposed on a rotation type acceleration generator in the manner as shown in FIG. 4, and measurement has been made of the meniscus holding force for the amount of recording liquid contained and acceleration in the tangential direction. In FIG. 4, reference numeral 401 designates the rotation type acceleration generator which is rotatable in the direction of arrow A. Designated by 402 is the recording head, 405 the polyethylene tube, and 406 the liquid filling the passageway in the tube. The axis passing through the center of the exhaust orifice 404 is the tangential direction with respect to the direction of rotation, and the length of the liquid filling the supply passageway extending along the direction in which centrifugal force acts is indicated by l.

Figure 5:
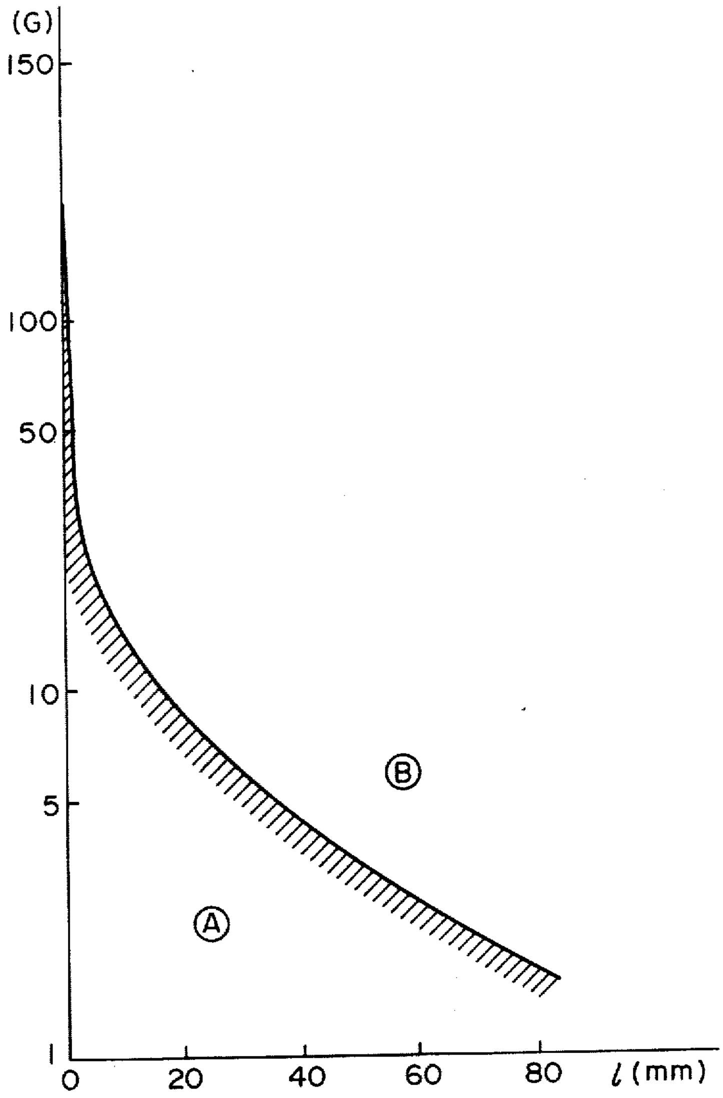
FIG. 5 is a graph showing the result of the measurement effected by the system of FIG. 4.

The result of the measurement carried out in the described manner is shown in FIG. 5. In FIG. 5, the area A is a portion in which the liquid can be stably exhausted, and the area B is a portion in which liquid leakage or retraction of the meniscus seriously occurs so that no stable exhaust is not effected. The meniscus holding force in the nozzle portion (the portion l') for a gravity acceleration G is as great as 140 G, but when liquid is present in the interior (polyethylene tube) of the supply passageway (the portion l), an acceleration corresponding to the mass of such liquid is applied and for l=80 mm, leakage has accured at the order of 1.5 G. This leads to a result that when the supply passageway l is moved at high speed in accordance with the movement of the recording head 402, liquid always leaks from the exhaust orifice 404 even if the piezoelectric element 403 is not driven.

From the foregoing fact, it is seen that where a supply tube having an inner diameter of the order of 0.6 mm is used, if the height difference between the exhaust orifice and the surface of the liquid, in other words, the height difference between the exhaust orifice and the inlet port at the end of the supply system, is maintained at 50 mm or less, leakage of the liquid or retraction of the meniscus has hardly occurred even if the apparatus is left in any inclined position and even if vibration or impact is imparted to the apparatus. Also, when the supply passageway connecting the recording head portion to the liquid reservoir portion has been designed so as to be movable with the recording head, no liquid has leaked from the exhaust orifice during the recording even if a very great acceleration has been applied. This makes an open system supply mechanism substantially possible in principle. In order to apply these basic matters to an actual recording system, the recording head portion and the liquid reservoir portion may be made integral with each other.

FIG. 6 shows a preferred embodiment of the liquid jet device in which the recording head portion and the liquid reservoir portion are made integral with each other so as to satisfy the basic conditions for achieving the objects of the present invention.

FIG. 6(*a*) is a schematic cross-sectional view of the liquid jet device, and FIG. 6(*b*) is a schematic front view thereof. The recording head portion 602 and the liquid reservoir portion 603 are integrally contained in a single container 601. The recording head portion 602 comprises an exhaust orifice 609 provided at the end thereof for exhausting liquid, a cylindrical piezoelectric element 608 as an electromechanical converter which is means for generating liquid drop exhaust energy which is the motive power for exhausting the liquid from the exhaust orifice 609, a liquid chamber portion 613 surrounded by and mechanically coupled to the piezoelectric element 608 so that the liquid drop exhaust energy is effectively supplied to the liquid present therein, and a supply tube 604 for supplying the liquid 605 from within the liquid reservoir portion 603 to the liquid chamber portion 613. The recording head portion 602 is designed and fabricated so that the liquid chamber portion 613 lies at a height from the liquid surface in the liquid reservoir portion 603 whereat the liquid 605 present in the liquid reservoir portion 603 can be supplied to the liquid chamber portion 613 only by the capillary force. The above-described recording head portion is of the type in which a cylindrical piezoelectric element is used as the liquid drop exhaust energy generating means, whereas in the present invention, the recording head portion is not restricted to such type but use may also be made of the recording head of the type as disclosed, for example, in U.S. Pat. No. 3,747,120, U.S. Pat. No. 3,946,398 or German Patent Publication No. 3,843,064.

The supply tube 604 forming a part of the recording head portion 602 is introduced from the recording head body into the liquid reservoir portion 603 so that the liquid 605 in the liquid reservoir portion 603 is directed into the recording head body, and the supply tube 604 is secured by the wall 606 of the container 601 so that it is not moved by vibration or impact. In FIG. 6, the supply tube 604 is shown as an extension of the nozzle portion 607 of the recording head portion 602, whereas the supply tube is not restricted to such a construction but, as shown in FIG. 3, it may be provided by connecting a metal or plastics tube or a glass tube to the recording head. Designated by 610 is the vent hole of the liquid reservoir portion 603 which serves to maintain the pressure within the liquid reservoir portion 603 at a level equal to the atmospheric pressure. Reference numerals 611-1 and 611-2 designate connectors for transmitting an extraneous electrical signal to the piezoelectric element 608 forming the recording head portion 602, and the piezoelectric element 608 and the connectors 611-1 and 611-2 are connected together by a signal line, not shown. In order that the liquid in the liquid reservoir portion 603 may be supplied smoothly and speedily to the liquid chamber portion 613 by capillary force, design is made so that the height difference L between the exhaust orifice 609 provided at the end of the nozzle portion 607 and the liquid inlet at the terminal end 612 of the supply tube 604 is set to a length which will be defined below. That is, L is defined as the distance $L_1$ between a straight line parallel to the free surface 614 of the liquid in the liquid reservoir portion 603 and passing through the center point of the terminal surface 612 of the supply tube 610 and a straight line parallel to said free surface 614 and passing through the center point of the orifice 609 (in the drawing, the center axis of the nozzle portion 607). When the recording is not executed with the container 601 mounted on the carriage in the manner as shown but that side on which the connectors 611-1 and 611-2 are provided is grounded to the carriage surface and the initial exhaust direction of the liquid exhausted from the orifice 609 is made to be just opposite to the gravity direction, namely, when the recording is executed with the container 601 mounted on the carriage so that the free surface of the liquid in the liquid reservoir portion 603 is parallel to the wall surface of the container 601 in which the connectors 611-1 and 611-2 are provided, said L is made to be $L_2$ shown in FIG. 6(*a*). In the present invention, the device is designed and manufactured so that the L is within the range shown below, by designing and manufacturing a great variety of recording heads and carrying out the above-described experiment on these heads and by analyzing and studying in detail the data concerning the relation between the capillary rising force and the meniscus holding force and the liquid drop exhaust characteristic obtained as the result of the experiment.

That is, when a recording liquid having a surface tension of 40–60 dyne/cm is used, the inner diameter of the supply tube 604 is usually 0.3–2.0 mm and L is 120 mm or less.

Further preferably, the inner diameter of the supply tube 604 is 0.5–1.2 mm and L is 65 mm or less, and optimally, the inner diameter of the supply tube 604 is 0.5–0.8 mm and L is 50 mm. By determining L within such range, leakage of the liquid from the exhaust orifice or retraction of the meniscus may be prevented even if the container 601 is rotated up and down or inclined.

The lower limit of L is usually determined to about 20 mm in view of the volume of the liquid 605 contained in the liquid reservoir portion 603 and the practical problem involved when the liquid jet device is incorporated into the liquid jet recording apparatus and further the problem of the speed of the reciprocal movement. For example, where the inner diameter of the supply tube is about 0.6 mm, a remarkably good liquid drop exhaust characteristic may be obtained by determining L to 50 mm or less, especially 40 mm or less.

A liquid jet device having a construction similar to that shown in FIG. 6 has been left with the orifice 609 facing upwardly or downwardly, but leakage of the liquid from the orifice 609 or retraction of the meniscus has not occurred. In this case, the inner diameter of the supply tube of such device has been 0.6 mm, L has been 50 mm and the surface tension of the recording liquid used has been 48 dyne/cm. Also, according to the confirmation of the leakage resulting from the acceleration in the tangential direction, no leakage has occurred up to 140 G and it has thus been proved that this device is practically very stable.

As described above, the device of the present invention enables an open system supply mechanism to be effectively applied to an actual recording system. That is, even under various conditions such as vibration, impact, inclination, etc., troubles such as non-exhaust of the liquid, retraction of the meniscus or leakage of the liquid can be prevented and stable exhaust and high reliability of the recording are ensured.

The device of FIG. 6 shows a basic construction which satisfies the requirements of the present invention and may advantageously have various mechanisms added thereto. One important thing is to provide a liquid covering member having continuous fine holes adjacent to the end of the supply tube. As an example of such embodiment, mention may be made of the method as shown in FIG. 7 wherein a liquid covering member 704 is inserted in a liquid inlet 703 at the terminal end 702 of the supply tube 701, or the method as shown in FIG. 8 wherein a liquid covering member 803 is disposed on the bottom surface 802 of the liquid reservoir portion 801. In the case of FIG. 8, the liquid inlet 806 at the terminal end 805 of the supply tube 804 forming the recording head portion is inserted into the interior of the liquid covering member 803 to fix the supply tube 804.

In the device shown in FIG. 8, the liquid covering member 803 is disposed only on the bottom surface 802 of the liquid reservoir portion 801, but the liquid covering member 803 may be contained in the entire liquid reservoir portion 801.

One of the effects of so providing the liquid covering member at the liquid inlet of the supply tube is as follows. When the device is left in a certain inclined position with a small amount of liquid contained in the liquid reservoir portion, there may be brought about a state in which the liquid inlet of the supply tube and the liquid do not contact each other, but even in such a state, the liquid introduced into the interior of the liquid covering member is sufficiently held and therefore, there is no problem for short-time printing and there is a merit that even if the device is left in said state for a long time, no air bubble is mixed with the liquid when the device next returns to its normal position, thus causing no hindrance to the next printing operation.

Also, by suitably setting the diameter of its internal holes, the liquid covering member may be made to serve also as a filter for preventing the mixing of air bubbles or dust with the liquid. As the liquid covering member, high molecular materials are preferable in that they are convenient to handle or that various shapes, hole diameters and hole densities can be selected arbitrarily. Such materials include polyethylene, polypropylene, polymethyl meta-acrylate, copolymer of methyl meta-acrylate and acrylonitrile, polyvinyl alcohol, polyurethane, synthetic rubber, etc., but materials having a high affinity with the liquid used are desirable for providing the liquid holding force within the liquid covering member and for preventing the mixing of air bubbles with the liquid.

High hole densities are desirable for enhancing the liquid covering and holding force and in the present invention, hole densities of usually 30–90%, preferably 30–70%, may be effectively utilized. An average hole diameter is usually in the range of 5–600μ, and if the liquid covering member is to be utilized also to prevent the mixing of air bubbles or dust, hole diameters smaller than the diameter of the orifice are desirable.

Reference is now had to FIGS. 9 to 12 to describe another preferred embodiment of the liquid jet device according to the present invention. FIGS. 9 to 12 show another embodiment of the liquid jet device according to the present invention. The housing 901 thereof comprises, for example, a rectangular box body of 3 cm×3 cm×3 cm, and has a recording head containing portion 902 and a recording liquid reservoir portion 903.

The head containing portion 902 comprises a groove of rectangular cross-section provided in the upper portion of the housing 901, and the recording head 904 as shown in FIG. 3 (or, of course, an ink jet recording head of any other type) is contained in the head containing portion 902.

A supply tube 906 is connected to the end of a nozzle 905 forming the recording head 904 in such a manner that the supply tube is substantially perpendicular to the nozzle 905, and the supply tube 906 extends through a partition wall 907 between the head containing portion 902 and the recording liquid reservoir portion 903 to the bottom of the recording liquid reservoir portion 903. The clearance between the supply tube 906 and the partition wall 907 is hermetically sealed, and the nozzle 905 is contained so that the fore end thereof is retracted somewhat (by a distance Δd) from the fore end of the head containing portion 902. If the fore end of the nozzle 905 is so retracted, the nozzle 905 may be prevented from being damaged during the transportation of the recording head or during the mounting or dismounting of the recording paper. The recording liquid reservoir portion 903 consists of a portion provided by removing the head containing portion 902 from the housing 901, and the bottom surface 908 thereof is inclined so that the recording liquid can be effectively supplied to the supply tube 906 even if the recording liquid is decreased in quantity.

A depression 914 is provided in the bottom surface 908 at a position opposed to the terminal end 913 of the supply tube 906 so that the last amount of recording liquid remaining on the bottom of the liquid reservoir portion 903 can be supplied to the supply tube 906. Also, a filter 909 having micro-holes for rendering the pressure within the recording liquid reservoir portion 903 equal to the atmospheric pressure is provided in the partition wall 907 between the recording liquid reservoir portion 903 and the head containing portion 902.

This filter 909 has the function of rendering the pressure within the recording liquid reservoir portion 903 equal to the atmospheric pressure, and can sufficiently pass gas therethrough but does not pass liquid therethrough unless the liquid is pressurized to a certain degree, so that the recording liquid cannot flow outwardly within a short time even if the liquid jet device is upset. The filter 909 used may usually have microholes having a diameter of 0.01–20μ, preferably, 1μ or less.

The material forming the filter 909 may be cellulose nitrate, cellulose acetate, polyamide Polyvinylchloride, trifluoroethylene or tetrafluoroethylene, and a product such as FLUOROPORE (trademark) (Sumitomo Electric Ind., Ltd.), Membranefilter (trademark) (Sartorius-Membranefilter GMBH.) or Millpore (trademark) (Japan Millpore Corp.) may be used as the filter.

A hole 910 provided in the head containing portion 902 forming the upper portion of the housing 901 is also a vent hole and such hole 910 may be provided if required.

That is, where the head containing portion 902 is filled with a bulking agent or the like to fix the recording head in and to the head containing portion 902 so that air cannot flow into the vent hole 909 through the opening of the head containing portion 902, the hole 910 may be provided so that air can flow into the vent hole 909 through the hole 910.

Conversely, where air can flow into the vent hole 909 through the opening of the head containing portion 902, the hole 910 is not always necessary.

Electrodes 911-1 and 911-2 are provided on the back side of the housing 901. These electrodes are terminals for applying a recording signal from outside the recording head to the recording head, and are connected to a piezoelectric element 912 by signal lines, not shown.

Accordingly, when such liquid jet device is used while being mounted on the head carriage of a calculator, typewriter, facsimile, word processor or other recording apparatus, said electrodes 911-1 and 911-2 may be connected to a connector provided on the head carriage, whereby a driving signal may be applied from the head carriage to the recording head.

Figure 12:
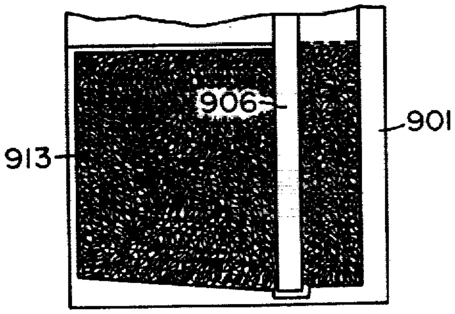

As shown in FIG. 12, the recording liquid reservoir portion 903 may be filled with a porous liquid containing member 913 having continuous microholes, and the recording liquid may fill the holes in the liquid containing member 913.

If the liquid reservoir portion 903 is so filled with the liquid containing member, the recording liquid is confined in each hole and therefore is not moved for sudden vibration or impact, thus substantially preventing waving of the liquid and mixing of air bubbles with the liquid.

Figure 13:
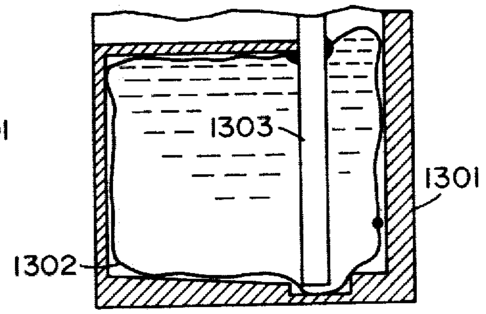
FIG. 13 is a cross-sectional view of essential portions of a further embodiment of the present invention.

FIG. 13 shows a part of a still another embodiment of the present invention in which a bag 1302 formed of soft high molecular film such as polyethylene, polypropylene, polyvinyl chloride or silicon is contained in a recording liquid reservoir portion 1301. The bag 1302 is filled with recording liquid, and the connecting portion with a supply tube 1303 is hermetically sealed so that even if the recording liquid is gradually decreased in quantity by being exhausted outwardly, the volume of the bag 1301 is also decreased with the decrease of the liquid, thus creating no blank space. Consequently, even if vibration or impact is imparted, no waving of the recording liquid occurs, thus preventing any abnormality from occurring to the exhaust condition of the recording head.

Figure 9:
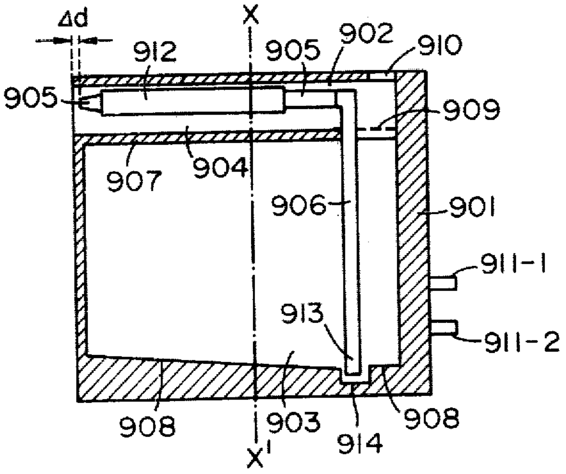
FIGS. 9 to 12 show another preferred embodiment of the present invention, FIG. 9 being a schematic cross-sectional view, FIG. 10 being a schematic front view, FIG. 11 being a cross-sectional view taken along line X–X′ of FIG. 9, and FIG. 12 being a cross-sectional view of essential portions.
Figure 10:
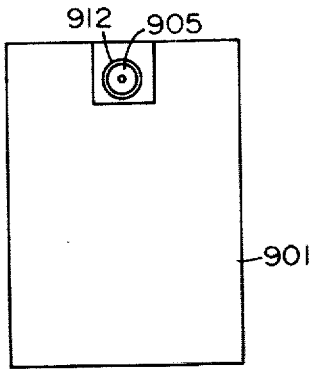
Figure 11:
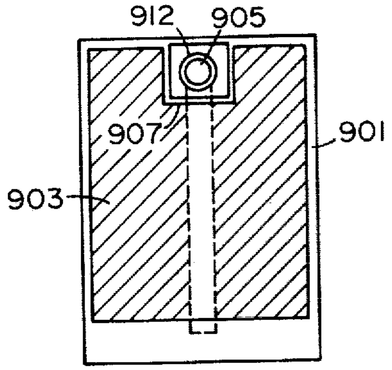

It is also a feature of the present embodiment that when the bag 1302 is employed, the film 909 of FIG. 9 need not be employed.

Figure 14:
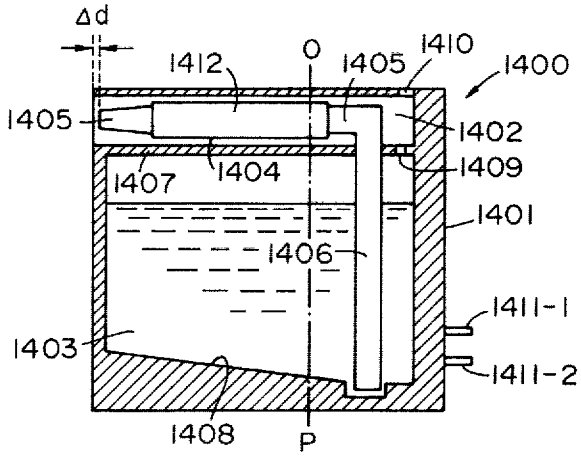
FIGS. 14 to 16 show still another preferred embodiment of the present invention, FIG. 14 being a schematic cross-sectional view, FIG. 15 being a schematic front view, and FIG. 16 being a cross-sectional view taken along line O–P of FIG. 14.
Figure 15:
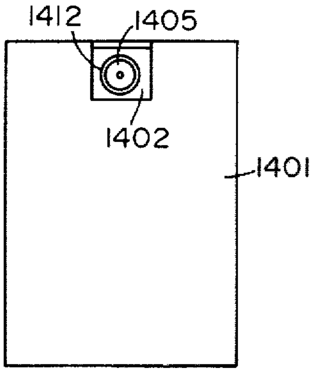
Figure 16:
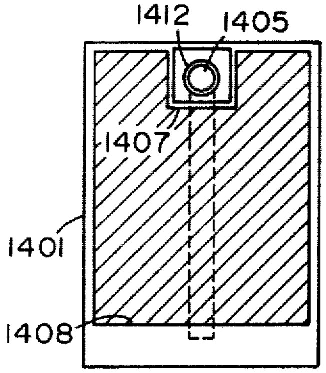

FIGS. 14 to 16 show a further embodiment of the present invention. The liquid jet device 1400 according to this embodiment is substantially similar in construction to the device of the FIG. 9 embodiment, and the only difference between the two embodiments lies in that the filter 909 is provided in the device shown in FIG. 9, whereas in the liquid jet device 1400, a vent hole 1409 is provided instead of such filter.

The vent hole 1409 is provided in the partition wall 1407 between the recording liquid reservoir portion 1403 and the head containing portion 1402 for the purpose of rendering the pressure within the recording liquid reservoir portion 1403 equal to the atmospheric pressure, and the diameter of this vent hole 1409 is 100 μm or less.

By providing such vent hole 1409, the recording liquid can be smoothly supplied without any variation in the pressure within the recording liquid reservoir portion 1403 even when the recording liquid is decreased in quantity due to the exhaust thereof. Further, since the vent hole 1409 is a fine hole, a film of recording liquid is produced over the vent hole 1409 due to surface tension even when the liquid jet device 1400 is upset, thus preventing the recording liquid from flowing out.

A hole 1410 provided in the head containing portion 1402 forming the upper part of the housing 1401 is also a vent hole, and such hole 1410 may be provided if required.

Figure 17:
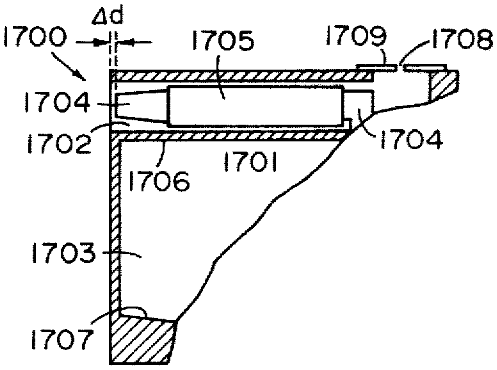
FIG. 17 is a cross-sectional view of essential portions of the liquid jet device according to a further embodiment of the present invention.

FIG. 17 schematically shows a part of still another embodiment of the present invention. The liquid jet device 1700 shown in FIG. 17 is provided with a pressing plate 1709 formed of rubber material and provided with a hole 1708 instead of the hole as shown in FIG. 9 or 14. This is for the following purpose. When the liquid jet device 1700 is upset or dust is mixed with the recording liquid to clog the supply tube or the flow passage in the head 1701 and thereby cause unsatisfactory exhaust, the pressing plate 1709 is pressed with the through hole 1708 closed by a finger or the like to thereby pressurize the interior of the recording liquid reservoir portion 1703 and recover the recording liquid.

Figure 18:
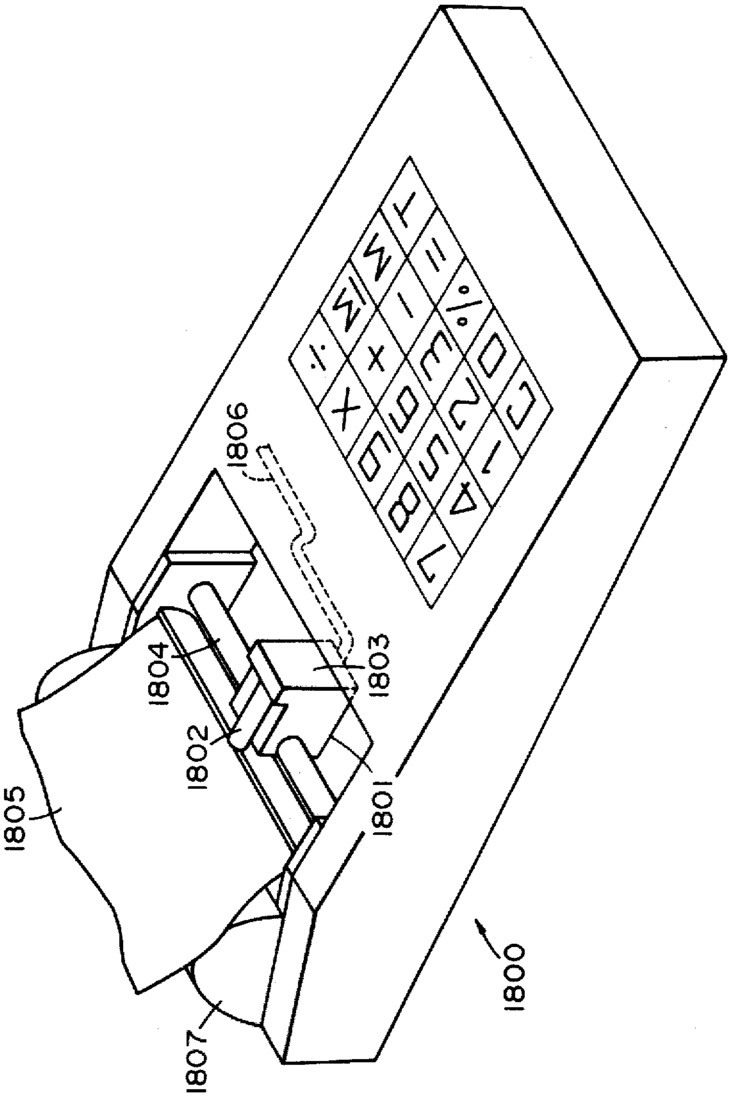
FIG. 18 is a perspective view of a small desk-top type electronic calculator having the liquid jet device of the present invention mounted thereon.

An example of the liquid jet recording apparatus having mounted thereon the liquid jet device of the present invention will now be described by reference to the drawings. FIG. 18 shows a small desk-top type electronic calculator 1800 having mounted thereon the device 1801 of the present invention. Designated by 1802 is a recording head portion having a liquid reservoir portion therein. The recording head portion 1802 is integrally mounted on a movable carriage 1803 fitted on a scanning shaft 1804. The integrally formed carriage 1803 and head portion 1802 are reciprocally moved on the scanning shaft 1804 in accordance with a write instruction and effect printing by exhausting recording liquid (ink) onto a recording medium (recording paper) 1805 from the recording head portion 1802. The movement of the carriage 1802 is accomplished by a motor or like drive source (not shown). Designated by 1806 is a supply hose for supplying the recording liquid to the liquid reservoir portion provided within the carriage 1803, and it is connected to a large-volume tank (not shown) installed within the calculator. Denoted by 1807 is the roll of the recording paper 1805.

Figure 19:
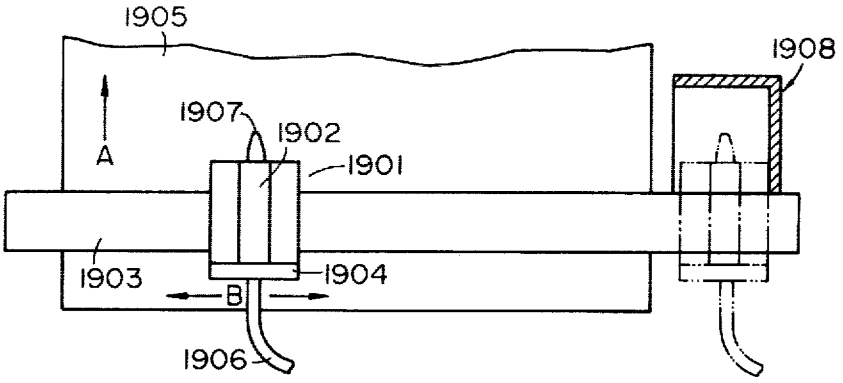
FIG. 19 is a fragmentary view of the recording apparatus of FIG. 18 having cleaning protective means added thereto.

FIG. 19 schematically shows a case where cleaning protective means is installed to provide the recording apparatus as shown in FIG. 18 with an additional function. The liquid jet device 1901, which scans the recording medium 1905 by electrical drive, reciprocally moves on the scanning shaft 1903 and exhausts drops of recording liquid from the exhaust orifice 1907 in accordance with an instruction based on write information, thereby effecting printing on the recording medium 1905.

On the other hand, when printing is stopped, the liquid jet device 1901 moves on the scanning shaft 1903 and comes to halt at a position indicated by phantom lines which is a reset position. Arrow A indicates the direction of movement of the recording medium 1905, and arrow B indicates the scanning direction of the liquid jet device 1901. In the process during which it returns to the reset position, the liquid jet device 1901 pushes the end of the exhaust orifice 1907 into cleaning protective means 1908 provided at the reset position.

Figures 20A, 20B, 20C:
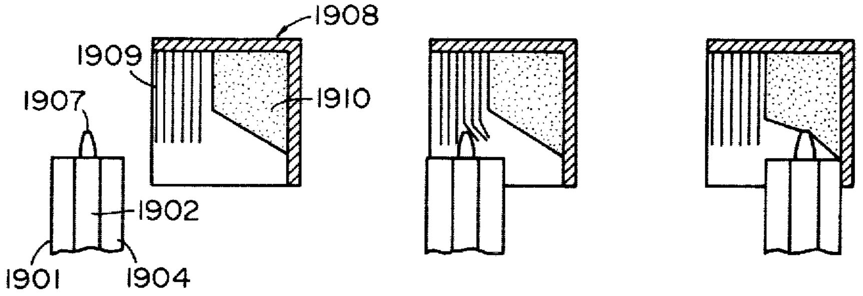
FIGS. 20(*a*), (*b*) and (*c*) illustrate the positional relation between the cleaning protective means and the liquid jet device.

FIGS. 20(*a*), (*b*) and (*c*) schematically shows a cross-section of the cleaning protective means 1908 and an example of this process. When the printing operation has been terminated (FIG. 20(*a*)) and the liquid jet device 1901 returns to its reset position, a brush-like group of hairs 1909 at the entrance of the cleaning protective means 1908 frictionally cleans the exhaust orifice 1907 (FIG. 20(*b*)). Subsequently, when the device has been placed at the reset position, the exhaust orifice 1907 contacts a liquid absorbing member 1910 containing a high boiling point solvent (FIG. 20(*c*).

The liquid jet device 1901 having thus returned to the reset position is cleaned by the brush-like group of hairs 1909 at the entrance of the cleaning protective means 1908 which removes the foreign substances having entered into the interior of the exhaust orifice 1907 or having adhered to the neighborhood thereof during the process of print scanning, and further the liquid jet device is held at the reset position while contacting the liquid absorbing member 1910 containing a high boiling point solvent, so that the liquid jet device is wet with the high boiling point solvent oozing out of the surface of the liquid absorbing member 1910 and in this state, drying of the recording liquid in the exhaust orifice 1907 can never occur.

That is, the exhaust orifice 1907 is held in the cleaning protective means 1908 disposed at the reset position and therefore, even when the exhaust of the recording liquid is continuously stopped for a long period of time or intermittently stopped, the exhaust orifice 1907 is maintained cleaned and protected against the influence of foreign substances or solidification of the recording liquid resulting from the drying thereof.

By so providing the above-described cleaning protective means at the reset position, the exhaust stability of the exhaust orifice is remarkably improved.

The brush-like group of hairs 1909 forming the cleaning protective means 1908 may be provided by hairs consisting of a high molecular compound such as plastics or fiber.

A bundle of resin-coated metal wires may also be used as the brush-like group of hairs 1909.

The liquid absorbing member 1910 may be formed of a continuous foamed body of flexible plastics which has a good liquid preserving characteristic and which is high is flexibility and wear resistance, preferably a foamed body of polyethylene or polyurethane.

The high boiling point solvent may be any material which is soluble with the recording liquid used and which is odorless and offers no pollution, preferably, polyatomic alcohol such as diethyleneglycol, glycerine or the like if the recording liquid is ink.

Figure 21:
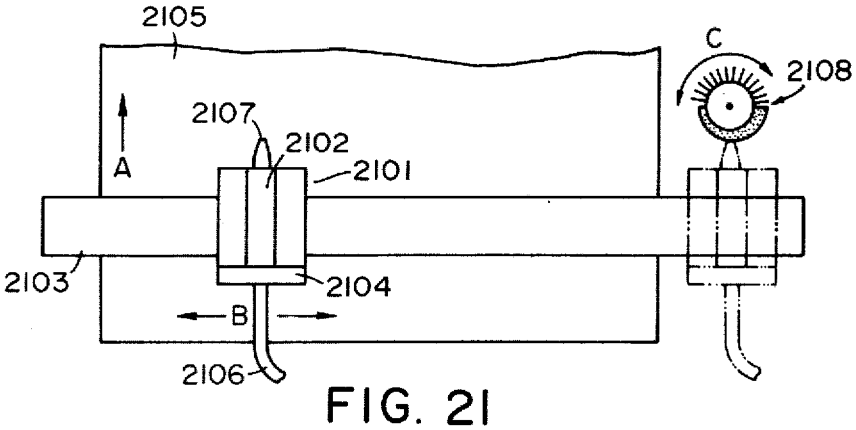
FIG. 21 is a fragmentary view of the recording apparatus of FIG. 18 having another cleaning protective means added thereto.
Figures 22A, 22B, 22C:
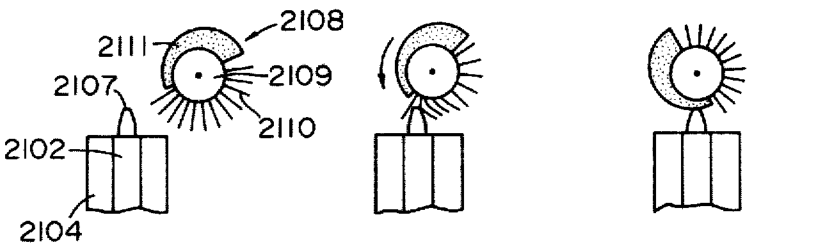
FIGS. 22(*a*), (*b*) and (*c*) illustrate the positional relation between said another cleaning protective means and the liquid jet device.

FIG. 21 schematically shows a case where another cleaning protective means is installed in the recording apparatus as shown in FIG. 18, and FIG. 22 shows the action of a rotatable cylinder member forming the essential portion of that cleaning protective means. The liquid jet device 2101, which scans a recording medium 2105 by electrical drive, is reciprocally moved on the scanning shaft 2103 as it exhausts recording liquid from the exhaust orifice 2107 in accordance with an instruction based on write information, thus effecting printing on the recording medium 2105.

On the other hand, when printing is stopped, the liquid jet device 2101 moves on the scanning shaft 2103 and comes to halt at a position indicated by phantom lines which is a reset position. Arrow A indicates the direction of movement of the recording medium, and double-headed arrow B indicates the scanning direction of the liquid jet device 2101. In the process during which it returns to the reset position, the liquid jet device 2101 comes into contact with the cleaning protective means 2108 provided at the reset position. Arrow C indicates the direction of rotation of the cleaning protective means 2108.

The cleaning protective means 2108 comprises a brush-like group of hairs 2110 and a liquid absorbing member 2111 both attached to the surface of a rotatable drum 2109, said liquid absorbing member 2111 containing a high boiling point solvent therein, and the action of the cleaning protective means 2108 is such that as shown in FIGS. 22(*a*) and (*b*), the brush-like group of hairs 2110 on the surface of the rotatable drum frictionally contacts the exhaust orifice 2107 with the rotation of the drum 2109 and removes therefrom any foreign materials mixed with the recording liquid or having adhered to the exhaust orifice during the print scanning (FIG. 22(*b*)).

Also, the liquid absorbing member 2111 containing a high boiling point solvent which is attached to the surface of the rotatable drum 2109 likewise comes into contact with the exhaust orifice 2107 with the rotation of the drum 2109 (FIG. 22(*c*)). At this time, the exhaust orifice 2107 becomes wet with the high boiling point solvent oozing out of the surface of the liquid absorbing member 2111 and as a result, drying of the recording liquid on the exhaust orifice 2107 can be completely prevented.

The action of the cleaning protective means 2108 illustrated with reference to FIG. 22 is shown on the assumption that by the rotation of the cleaning protective means due to its frictional contact with the exhaust orifice 2107, the exhaust orifice contacts the brush-like group of hairs 2110 and the liquid absorbing member 2111. Consequently, the initial set position is important, but there is no necessity of providing a mechanism for actuating the cleaning protective means 2108 and this leads to a merit that the cleaning protective means can be designed inexpensively and compactly.

If the movement of the device 2101 is associated with the movement of the cleaning protective means 2108 by simple transmission means such as worm gear and wire, more complete cleaning and protection will be ensured.

Figure 23:
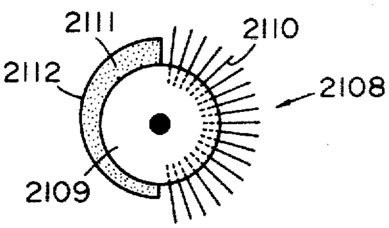
FIG. 23 shows the construction of the cleaning protective means.

FIG. 23 illustrates the construction of the cleaning protective means 2108. The brush-like group of hairs 2110 consisting of plastics or fiber is planted on one half of the circumference of the rotatable drum 2109, and the liquid absorbing member 2111 consisting of foamed polyethylene or foamed polyurethane is adhesively attached to the other half of the circumference of the rotatable drum. The liquid absorbing member 2111 may be attached with a uniform thickness, but a more reliable effect may be expected if that side of the liquid absorbing member 2111 which first contacts the exhaust orifice 2107 is formed so as to have a smaller thickness, as shown in FIG. 23. Further, a cover 2112 formed of thin fiber may be attached to the surface of the liquid absorbing member 2111 to prevent the absorbing member 2111 from being damaged.

The liquid absorbing member 2111 contains therein an odorless and non-poisonous high boiling point solvent as already noted.

Figure 25:
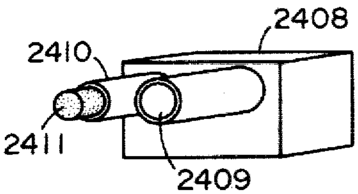
FIG. 25 is a schematic perspective view showing essential portions of the cleaning protective means.
Figure 24:
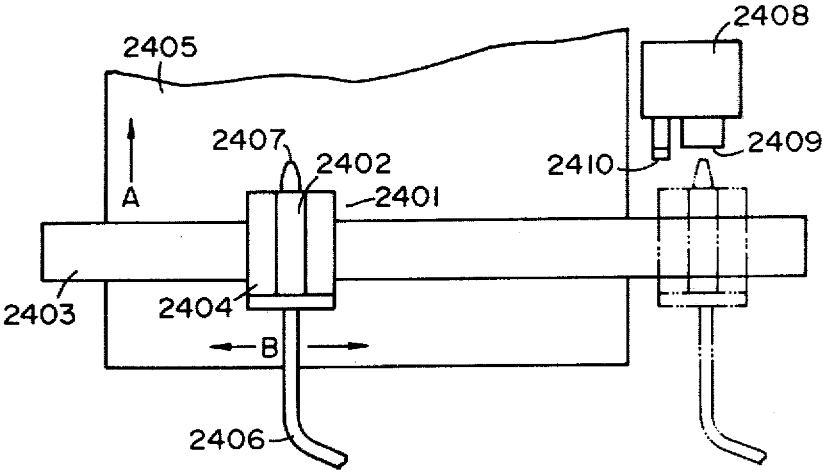
FIG. 24 is a fragmentary view of the recording apparatus of FIG. 18 having still another cleaning protective means added thereto.

FIG. 24 schematically shows a case where exhaust orifice cleaning means is added to the recording apparatus as shown in FIG. 18, and FIG. 25 is a schematic perspective view of such cleaning means. In FIG. 24, the liquid jet device 2401, which scans a recording medium 2405 by electrical drive, is reciprocally moved on the scanning shaft 2403 as it exhausts recording liquid from the exhaust orifice 2407 in accordance with an instruction based on write information, thus effecting printing on the recording medium 2405. On the other hand, when printing is stopped, the liquid jet device 2401 is moved on the scanning shaft 2403 and comes to halt at a position indicated by phantom lines which is a reset position. Arrow A indicates the direction of movement of the recording medium, and double-headed arrow B indicates the scanning direction of the liquid jet device 2401. The device 2401 placed at its reset position forcibly exhausts the recording liquid to the recovery opening 2409 of a recovery tank 2408 forming the cleaning means, manually or by electrical signal. When the device 2401 is moved toward the print scanning area, the recording liquid adhering to the neighborhood of the exhaust orifice 2407 after the termination of the forcible exhaust is frictionally removed by a liquid absorbing member 2411 attached to a friction opening 2410 provided adjacent to the recovery opening 2409.

As shown in FIG. 25, the inner diameter of the recovery opening 2409 is larger than that of the friction opening 2410, and the length of the friction opening 2410 must be sufficient to directly contact the exhaust orifice 2407. However, the recovery opening 2409 should preferably be suitably spaced apart from the exhaust orifice 2407.

Further, the end portion of the friction opening 2410 directly contacts the moving exhaust orifice 2407 and therefore, only the liquid absorbing member 2411 must have its head projected. This is for preventing the exhaust orifice 2407 from being damaged when it is contacted.

The liquid absorbing member 2411 will now be described. The material used for this member should preferably be one which has a high liquid preservation characteristic as already noted and which has such flexibility which will not damage the exhaust orifice when contacting the exhaust orifice and in addition, has a high wear proof. The material should of course have a high resistance to the solvent.

The material may be, for example, foamed resin such as foamed polyethylene, foamed polypropylene, foamed polystyrene, foamed polyvinyl chloride, foamed polycarbonate, foamed polyurethane or foamed polyamide, or yarn or fiber, or sponge.

What we claim is:

1. A liquid jet recording apparatus comprising:

a liquid jet device comprising:

recording head portion provided with an orifice at the end of said recording head portion for exhausting liquid therethrough, a liquid chamber portion communicating with said orifice, a supply passageway for supplying the liquid to said liquid chamber portion, and liquid drop exhaust energy generating means mechanically coupled to at least a part of said liquid chamber portion in such a coupled relationship that liquid drop exhaust energy can be supplied to the liquid present in said liquid chamber portion;

a liquid reservoir portion connected to said head portion so that the liquid present in the interior is supplied to said liquid chamber portion from an inlet at one terminal end of said supply passageway; and extraneous electrical connector means for supplying an extraneous electrical signal to said liquid drop exhaust energy generating means to drive said generating means;

said portions and means being movable together, said liquid chamber portion lying at a height from the liquid surface in said liquid reservoir portion whereat the liquid present in said liquid reservoir portion can be supplied to said liquid chamber portion by a capillary force; a scanning shaft on which said liquid jet device is reciprocally movable;

cleaning protective means for cleaning and protecting said orifice provided at a reset position lying at one end of said scanning shaft, said cleaning protective means including a rub-cleaning member and a liquid-absorbing member containing high boiling point solvent; and a recording member containing portion.

2. An apparatus according to claim 1, wherein said liquid-absorbing member is continuous foam body of flexible plastic.

3. An apparatus according to claim 2, wherein said flexible plastic is polyethylene or polyurethane.

4. An apparatus according to claim 1, wherein said high boiling point solvent is polyatomic alcohol.

5. An apparatus according to claim 4, wherein said polyhydric alcohol is diethylene glycol or glycerine.

6. An apparatus according to claim 1, wherein said rub-cleaning member includes a brush like group of hairs.

7. An apparatus according to claim 6, wherein said brush is of plastic or fibers.

8. An apparatus according to claim 6, wherein said brush is of resin coated metal wires.

9. A liquid jet recording apparatus according to claim 1, wherein said cleaning protective means has a liquid recovery opening, a friction opening portion provided adjacent to said liquid recovery opening and mounted at a position whereat a liquid absorbing member contacts said orifice, and a liquid recovery tank.

* * * * *